United States Patent [19]

Reinauer et al.

[11] 4,073,632
[45] Feb. 14, 1978

[54] FILTER BAG ASSEMBLY

[75] Inventors: Thomas V. Reinauer, Summit; Robert W. Duyckinck, New Providence; Frank B. Handwork, Summit, all of N.J.

[73] Assignee: United States Filter Corporation, New York, N.Y.

[21] Appl. No.: 593,462

[22] Filed: July 7, 1975

[51] Int. Cl.² ............................................. B01D 46/02
[52] U.S. Cl. ........................................ 55/374; 55/302; 55/341 R; 55/379; 55/498; 55/499; 55/501; 55/507; 55/DIG. 26
[58] Field of Search ................. 55/374, 375, 379, 302, 55/499, 500, 507, 508, 341 R, 341 NT, 341 M, 341 H, 341 MC, 341 PC, 341 HM, 498, 501, 509, DIG. 26; 417/151, 167, 170

[56] References Cited

U.S. PATENT DOCUMENTS

| 1,821,202 | 9/1931 | Birkholz .................................. 55/374 |
| 2,072,906 | 3/1937 | Rosenberger ......................... 55/379 X |
| 2,308,310 | 1/1943 | Ruemelin, Jr. et al. .... 55/341 NT X |
| 2,805,731 | 9/1957 | Kron ....................................... 55/375 |
| 3,224,172 | 12/1965 | Eiben .................................. 55/375 X |
| 3,513,500 | 5/1970 | Hori .................................... 55/379 X |
| 3,680,285 | 8/1972 | Wellan et al. ...................... 55/374 X |
| 3,710,552 | 1/1973 | Genton .......................... 55/341 R X |
| 3,765,152 | 10/1973 | Pausch ........................... 55/341 R X |
| 3,856,489 | 12/1974 | Vokral .................................. 55/379 |
| 3,874,857 | 4/1975 | Hunt et al. ......................... 55/379 X |
| 3,876,402 | 4/1975 | Bundy et al. ...................... 55/379 X |
| 3,884,659 | 5/1975 | Ray ....................................... 55/379 |

FOREIGN PATENT DOCUMENTS

| 115,591 | 8/1942 | Australia ............................... 55/508 |
| 169,368 | 11/1959 | Sweden ................................. 55/508 |
| 879,781 | 10/1961 | United Kingdom ................... 55/374 |

*Primary Examiner*—Bernard Nozick
*Assistant Examiner*—Kathleen J. Prunner
*Attorney, Agent, or Firm*—Robert E. Isner

[57] ABSTRACT

An improved filter bag mounting assembly for fabric type dust collectors compositely constituted of a selectively shaped mounting and filter media supporting member adapted for removable insertion in a complementally sized receiving aperture in a tube sheet, a filter media sheathed retainer assembly terminally connected at one end, in releasably latched gas tight relation to the mounting member and a closure plug disposed in the other terminal end of said media sheathed retainer and secured thereto in releasable gas tight latched relation.

15 Claims, 7 Drawing Figures

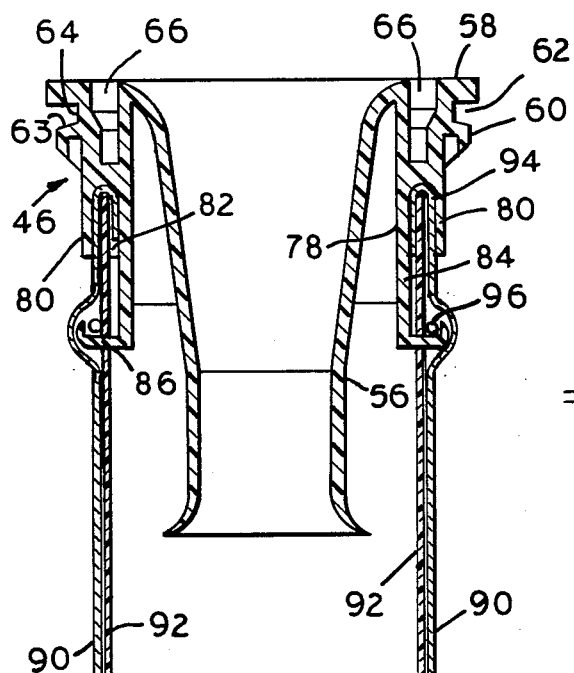
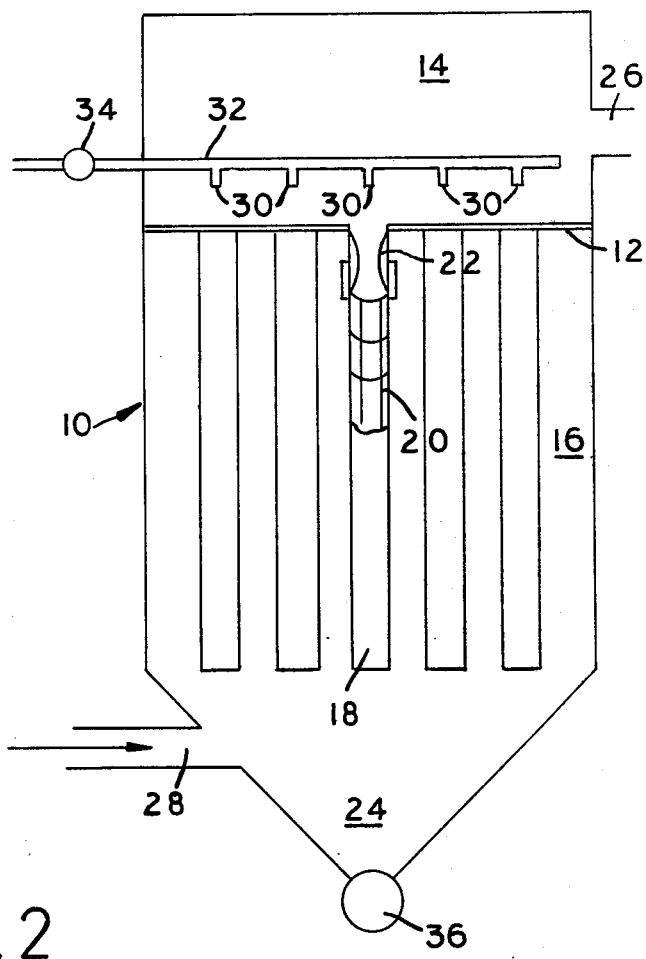
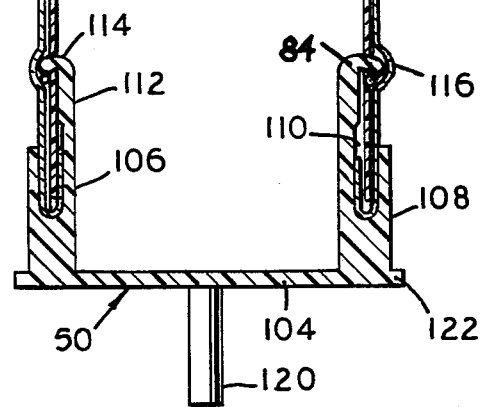
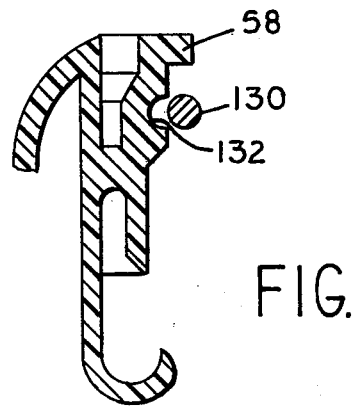
FIG. 1
FIG. 2
FIG. 7

FILTER BAG ASSEMBLY

This invention relates to filter bag mounting assemblies for fabric type dust collectors and particularly to improved construction for filter bag mounting assemblies of unitary character for pulse jet cleanable fabric type dust collectors.

Fabric type dust collectors employing pulse jet cleaning techniques wherein cleaning of an elongate tubular shaped filter medium is effected by the abrupt and momentary release of high energy pulses of gaseous cleaning fluid have come into widespread usage during the past two decades. Such usage is largely attributable to the relatively high efficiency cleaning effected thereby and to the relative freedom from routine maintenance operations that are attendant thereto. Among the factors that have impeded an even wider usage of this type of dust collector has been the necessary utilization of inordinately long tubes of filter media of relatively large diameter in order to provide sufficient filter media surface needed to accommodate the required air flow parameters of a given installation with a minimal utilization of floor space; a relatively high initial cost that is, at least in part, attributable to the relatively high fabrication and assembly costs for the individual filter bag assemblies included therein and to difficulties in effecting replacement of individual elongate tubular filter bags when such replacement is required. One practical consequence of the foregoing has been a preferential usage of such pulse jet type of dust collectors in relatively large air flow installations with cost considerations dictating a modular approach employing filter bag and retainer subassemblies of relatively large standardized dimensions. A deleterious effect of such economically directed standardization of dimension in relatively large sizes has been a marked lack of flexibility in efficiently accommodating the required air flow parameters of low volume installations in smaller sized units and the concomitant difficulties of competing on a price basis with other types of dust collectors in such low volume fields of use.

This invention may be briefly described as an improved construction for filter bag mounting assemblies of unitary character for bag type dust collectors and which include, in its broad aspects, a selectively shaped mounting and filter media supporting member adapted to be removably insertable in a complementally sized receiving aperture in a tube sheet, a filter media sheathed tubular retainer grid assembly terminally connected to one end in releasably latched gas tight relation to the dependent end of the mounting member and a closure and positioning plug disposed in the other terminal end of said tube of filter medium and connected thereto in releasably latched gas tight relation. In its more narrow aspects, the subject invention includes the provision of a selectively contoured and readily formable mounting and filter media supporting member shaped to integrally include a venturi shaped gas passage conduit therethrough and of a character to facilitate rapid and economic assemblage of filter bag mounting assemblies of unitary character and the facile and convenient installation and removal thereof from dust collectors when required. Still other aspects of the subject invention include the provision of an improved construction for a readily assemblable latchable mounting of a filter medium sheathed retainer grid assembly in effectively gas tight relation with a tube sheet mounting member and a closure plug.

Among the advantages of the subject invention is a permitted facile and rapid snap together type of component assembly and a concomitant marked reduction in cost of fabricating and assembling filter bag assemblies for pulse jet fabric type dust collectors. Further advantages include a permitted marked diminution in both the diameter and length of standardizable filter bag assemblies for pulse jet cleanable dust collectors, a permitted halving of the height of such type of dust collectors and an accompanying reduction in the cost of such collectors per square foot of filter media employed therein. A still further advantage is the provision of filter bag assemblies that may be easily and conveniently installed and/or removed with equal facility from the top or from the side of a dust collector.

The object of this invention is the provision of improved constructions for unitary filter bag assemblies for pulse jet cleanable dust collectors.

Other objects and advantages of the subject invention will become apparent from the following portion of this specification and from the appended drawings which illustrate, in accordance with the mandate of the patent statutes, presently preferred constructions of filter bag assemblies incorporating the principles of this invention.

Referring to the drawings:

FIG. 1 is a side elevation, partially in section of one conventional type of pulse jet cleanable fabric dust collector;

FIG. 2 is an enlarged vertical section of an improved filter bag assembly incorporating the principles of this invention;

FIG. 7 is a schematic side elevation of an alternative snap in type construction for the mounting unit.

Figure 3:
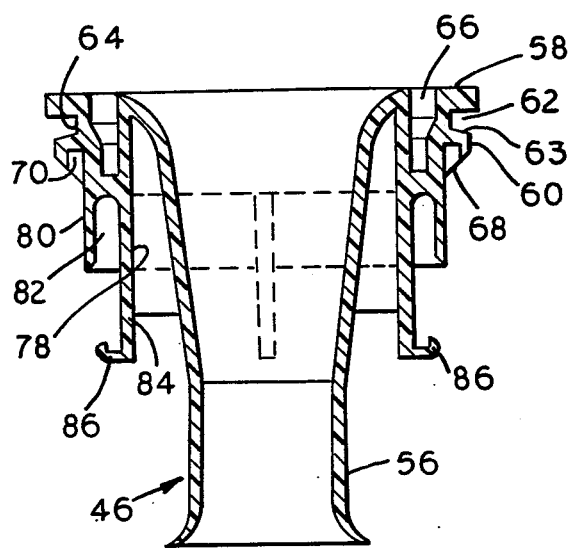
FIG. 3 is a vertical section of a tube sheet engaging mounting member incorporating the principles of this invention.

Referring to the drawings and initially to FIG. 1 thereof, there is schematically set forth, by way of orientative example, certain of the basic operating components of a pulse jet cleanable dust collector of conventional construction. Such type dust collectors conventionally include a circular or rectangular perimetric housing, normally of modular character and generally designated 10, having a transverse gas impervious tube sheet 12 mounted therein which operatively subdivides the interior of the housing 10 into clean air and dirty air plenum chambers 14 and 16, respectively. Dependently supported by the tube sheet 12 within the dirty air plenum 16 are a plurality of elongate cylindrical tubes or socks 18 of permeable filter media mounted in surrounding relation over suitable complementally shaped grid-like retainers 20. Such permeable filter tubes 18 are conventionally formed of felted or fabric materials or other dry type filter media and the interior of the filter chambers defined thereby are disposed in fluid communication with the clean air plenum chamber 14 through the upper open ends thereof which normally include individual venturi conduit means 22 disposed within a suitable receiving aperture in the tube sheet 12. The retainers 20 are conventionally in the nature of an open grid formed from metallic or resinous longitudinally and transversely disposed rather heavy wire or light bar stock welded together at the crossover points therebetween so as to form a relatively rigid structure that prevents collapse of the sheath of filter medium 18 disposed thereabout during normal filter flow operation. Such grids may alternatively be constituted of cylinders of highly perforated sheet material of planar or corrugated surface configuration.

In the normal filter flow operation of a collector of the type illustrated, the gaseous carrier bearing the particulate material to be separated is induced to initially flow into the hopper portion 24 of the collector through an entry conduit 28, thence upwardly therefrom into the dirty air plenum 16, through the permeable medium filter socks 18, and upwardly therewithin and through the venturi conduit means 22 into the clean air plenum 14 and from thence externally of the housing 10 by a fan or other prime movant normally disposed downstream in the clean air exhaust conduit 26.

The particulate matter carried by the dirty air or carrier gas stream is accumulated on the outer surfaces of the permeable filter socks 18 where such accumulation operates to progressively reduce the permeability of the medium. Removal of such separated particulate matter from the external surfaces of the filter media 18 is effected by the abrupt and momentary emission of jets of high energy cleaning gas from the jet nozzles 30 disposed in spaced coaxial alignment with the venturi conduit means 22. Conventionally, a plurality of such jet nozzles 30 are connected to an elongate blow pipe 32 which, in turn, is connected to a remote source of compressed cleaning gas (not shown) through a quick acting valve assembly 34. The particulate matter removed from the external surfaces of the filter media 18 falls into the hopper 24 from which it is periodically removed through a rotary airlock type valve assembly 36.

In the cleaning cycle phase of operation of such pulse jet type dust collectors, the quick acting valve 34 is periodically actuated to permit the transfer of compressed cleaning gas from the remote source thereof into the interior of the blow pipe 32 and from which it exits in jet form from the nozzles 30 as pulses of high energy gas of very short duration, i.e. — normally of 1/10 second or less. In a properly designed pulse jet dust collector, such emitted pulses operate to momentarily halt the normal filter flow of cleaned gas upwardly through the venturi conduit means 22 and create an abrupt and momentary pressure rise within the filter socks 18 with a concomitant shockwave-like action to effect a cleaning thereof.

Referring now more particularly to FIG. 2, an improved unitary filter bag assembly constructed in accord with the principles of this invention broadly includes a selectively contoured mounting and filter media supporting member, generally designated 46, adapted to be removably insertable in a complementally sized receiving aperture in the tube sheet 12; a filter media sheathed tubular retaining grid, generally designated 48, terminally connected at its upper end in releasably latched gas tight relation to the dependent skirt portion of the mounting member 46 and a closure and positioning plug, generally designated 50, disposed in the other terminal end of said filter medium sheathed retainer grid 48 and connected thereto in releasably latched gas tight relation.

Figure 4:
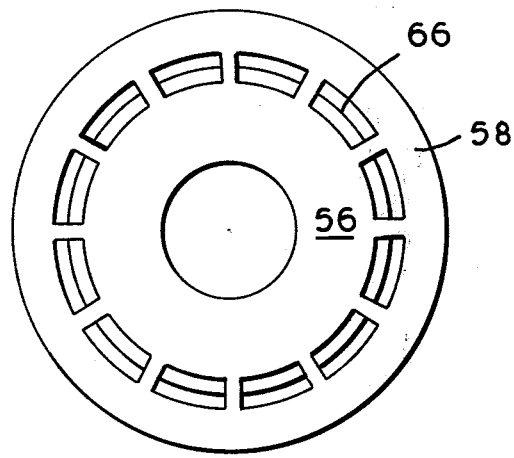
FIG. 4 is a plan view of the mounting member illustrated in FIG. 3.

As best shown in FIGS. 2, 3 and 4, the mounting and filter medium supporting member 46 is preferably formed as a unitary or one piece structure of relatively rigid but elastically deformable moldable resinous material. Such mounting member 46 is desirably selectively contoured to integrally provide a venturi shaped conduit portion 56 for the passage of the cleaned carrier gas therethrough and into the clean air plenum 14. In the embodiment shown, the upper portion of the mounting member 46 includes a first outwardly extending peripheral flange member 58 disposed transverse to the longitudinal axis of said gas passage conduit 56 and of a transverse extent sufficient to overlie the marginal defining edge of the complemental receiving aperture in the tube sheet 12. Operatively associated with the flange 58 is a second outwardly extending flange member 60 disposed in adjacent spaced relation with the flange 58 and conjointly defining therewith a transversely disposed perimetric annular tube sheet receiving channel 62. The base 64 of the tube sheet receiving channel should be of a diametric extent sufficient to be closely contained within the receiving aperture in the tube sheet 12 and the longitudinal width of said channel 62 should desirably be of sufficient extent as to effect a press-fit type of compressive interfacial engagement between the abutting facing surfaces of the flange portions 58 and 60 with the upper and lower surfaces of the tube sheet 12, respectively. As illustrated, the desired gas tight interengagement of the tube sheet by the facing surfaces of the flanges 58 and 60 is facilitated by having the upper surface 63 of flange 60 sloped or inclined to the horizontal. A preferred construction also incorporates striations in the general form of a screw thread or the like on the base surface 64 of the tube sheet receiving channel 60, which striations also contribute to the provision and maintenance of a gas tight seal between the marginal defining edge of the receiving aperture and the abutting facing surfaces of the mounting unit 46.

As previously pointed out, the mounting member 46 is preferably formed of moldable resinous material of relatively rigid elastically deformable character or of having sufficient "memory" to rapidly return to its original configuration after deformation thereof. In certain cases, metallic assemblies may be employed. Such material should be relatively rigid in character although possessing sufficient resilience to permit the snap in type of installation and removal operations as hereinafter described with attendant reformation of the material employed. Suitable materials include polypropylene, polyvinylchloride, and synthetic rubbers of various types. A plurality of recesses 66 are preferably included in the upper surface of the mounting element 46 which not only serve to reduce the amount of material employed but also facilitates the required degree of elastic deformation or displacement of the structure to permit its snap in insertion and subsequent removal from the receiving aperture in the tube sheet 12.

As best shown in FIG. 3, the second outwardly extending flange member 60 is preferably formed with a sloping undersurface 68 and also incorporates material reducing and displacement facilitating apertures 70 therewithin to facilitate the pressure induced snap in type of mounting of the unit 46 in the receiving aperture in the tube sheet 12.

FIG. 7 shows an alternative construction wherein the second flange 60 is replaced by an expanded split ring 130 seated within an annular recess 132 which is adapted to be reduced in circumference by an amount sufficient to permit its passage through the aperture in the tube sheet 12 after which it will return to its expanded configuration to cooperate in maintaining the desired sealing engagement between the mounting member 46 and the tube sheet 12.

The dependent skirt portion of the mounting and filter medium supporting member 46 includes a first longitudinally extending and dependent sleeve member 78 which may also conjointly function as a portion of the gas passage conduit in constructions which do not include a venturi or other selectively shaped conduit member 56. Disposed in concentrically spaced surrounding relation with said first sleeve member 78 is a second dependent sleeve member 80. The sleeve members 78 and 80 conjointly define a longitudinally disposed cylindrical filter medium receiving channel or socket 82 therebetween, which is of transverse extent sufficient to closely accommodate the terminal end of the filter media retainer element and one or more layers of filter media disposed in abutting interfacial relationship therewith.

Integral with and dependent from the first sleeve member 78 are a plurality of displaceable latching fingers or members 84 each having a hook-like portion 86 at the terminal end thereof disposed in the plane of said filter media receiving channel 82 and adapted to latchably engage a suitably located transverse member 96 (or perforation) of the retainer grid when the upper terminal end thereof is properly located within the receiving socket 82.

As illustrated in FIG. 2, the filter medium sheathed retaining grid 48 is compositely formed of a tube or sock 90 of fabric type filter media, preferably a relatively hard felt. Disposed within the tube of filter medium 90 is a grid-like retainer 92 conventionally formed of perforated sheet or longitudinal and transverse metal or resinous wire but herein preferably constituted of a single piece of moldable resinous material when an installation will so permit. As illustrated, the filter sock 90 is of sufficiently greater length than the grid-like retainer 92 to permit the folding-over of the upper end, as at 94 thereof, to obtain an effectively gas tight pressure fit of the retainer and doubled media layer within the filter media receiving socket or channel 82 without interference with the latching relationship of the hook-like terminal ends 86 on the latching fingers 84 with an appropriately located transverse member 96 (or perforation) on the retainer grid.

Figure 5:
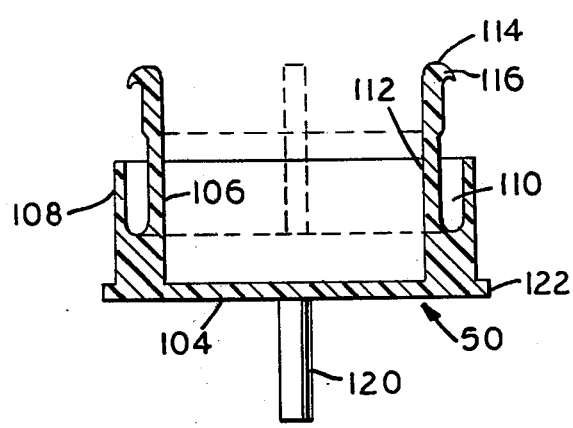
FIG. 5 is a vertical section of a filter tube closure member embodying the principles of this invention.
Figure 6:
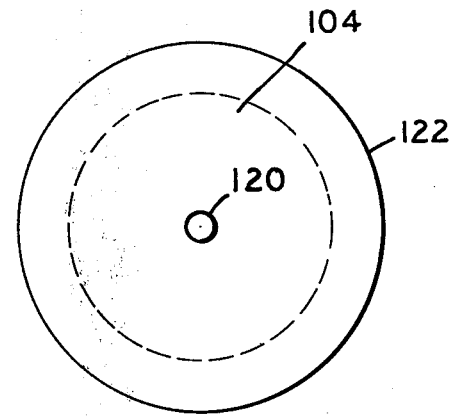
FIG. 6 is a bottom plan view of the closure member illustrated in FIG. 5.

As best shown in FIGS. 2, 5 and 6, the subject unitary filter assembly also preferably includes a plug-like member 50 which closes the dependent terminal end of the filter media sheathed tubular retainer assembly in a releasably latched interrelationship therewith. The closure member 50 desirably includes a gas impervious base plate 104 having a first longitudinally extending sleeve member 106 disposed in concentrically spaced relation with a surrounding second sleeve member 108. The first and second sleeve members 106 and 108 conjointly define a cylindrically shaped filter medium receiving socket or channel 110 therebetween of a transverse extent sufficient to closely accommodate the terminal end of the retainer grid 92 and one or more layers of filter media 90 disposed in abutting interfacial relation therewith. Extending from the sleeve 106 are a plurality of displaceable latching members 112 each having a dependent end 114 of increased transverse extent and terminating in a hook-like portion 116 disposed in the plane of the filter media receiving channel 110.

As previously described in conjunction with the mounting member, the dependent terminal end of the filter media 90 is folded over the dependent terminal end of the grid-like retainer 92 and such multi-lamina end portion is disposed in a compressive press-fit relation within the receiving channel 110 to form an essentially gas tight seal between the facing surfaces thereof. When so positioned, the hook-like portion 116 of the latching members 114 will be disposed in supportive latching engagement with one of the transverse members 96 (or perforation) forming the retainer grid, which operates to maintain the closure plug in operative assembled relation with the filter medium sheathed retainer grid.

Desirably, the closure plug also includes a dependent positioning pin 120 extending from the undersurface of the base plate 104 and receivable in a suitable guide plate mechanism (not shown) to properly position the assembled filter bag assembly in an operative dust collector unit.

As described earlier, the subject construction is particularly well adapted for filter bag assemblies of relatively diminutive character, although the described structure is not dimensionally limited in any manner. By way of illustrative example, an assembly of the type described above having dimensions of about 2 ½ inches internal dimeter for the retainer 92, an active filter length of 48 inches and an overall length of about 50 inches appears to be of particular utility.

Such now permitted diminutive diametric extent permits a highly efficient packing of multiplicities of such assemblies within a given collector with a concomitant permitted increase in the ratio of cloth to volumetric displacement therein. Because of such permitted close packing, the base plate 104 of the closure member 50 desirably includes a perimetric flange 122 to serve as a bumper or spacer to minimize, if not prevent, damage to the filter media 90 as might be occasioned by vibration or other physical displacement of the filter elements in mobile or other type equipment.

As will now be apparent, the subject construction is easily and inexpensively formed, apart from the filter media itself, of readily moldable resinous materials and is particularly adapted to be rapid, inexpensive and simple assembly and installation by a snap in type operation. In addition to such advantageous features, the subject construction is readily installed and removed as a unitary assemblage within the receiving apertures in the tube sheet in top loading type of dust collectors. The unit, however, is equally adapted to ready installation and removal from side access dust collectors wherein the mounting unit 46 would be independently mounted on the tube sheet and a subassembly comprising the filter media sheathed retainer grid 48 having the closure plug 50 previously assembled therewith is snapped into place on the previously mounted mounting element 46. Disassembly in each side access collectors is readily effected by a slight upward displacement of the filter media sheathed retainer grid 48 coupled with a rotative displacement thereof to effect disengagement of the latching hooks 86 from the transverse grid members 96 and consequent permitted withdrawal of the filter media sheathed retainer grid assembly 48 and closure plug 50 from engagement with the mounting unit 46.

Having thus described our invention, we claim:

1. An improved filter bag assembly for dust collectors wherein particulate matter is separated from a carrier gas stream by selective passage of the carrier gas through an elongate tube of permeable filter medium terminally mounted in fluid communication with a receiving aperture in a gas impervious tube sheet separating the clean air and dirty air plenum chambers of said dust collector, said assembly comprising a unitary mounting member of relatively rigid elastically deformable material adapted to be disposed within the receiving aperture in said gas impervious tube sheet and selectively shaped to define a conduit portion for passage of the carrier gas therethrough and into said clean air plenum chamber a tube sheet engaging portion disposed at one end of said conduit portion, and a dependent skirt portion for supportively engaging the terminal end of the tube of filter medium suspended therefrom extending downwardly from the tube sheet engaging portion and disposed in spaced surrounding relation with said conduit portion within said dirty air plenum chamber said tube sheet engaging portion including an outwardly extending peripheral flange member disposed transverse to the longitudinal axis of said conduit portion and sized to overlie the marginal defining edge of said receiving aperture in the tube sheet, and displaceable means disposed in adjacent spaced relation with said flange member and defining a transversely disposed perimetric annular tube sheet receiving channel therebetween sized to closely accommodate the marginal defining edge of said receiving aperture in said tube sheet, said dependent skirt portion including, a first longitudinally extending dependent sleeve member, a second longitudinally extending dependent sleeve member disposed in concentrically spaced surrounding relation with said first sleeve member and defining a longitudinally disposed filter medium receiving channel therebetween, and a plurality of displaceable latching members dependent from said first sleeve member and having hook-like terminal end portions extending outwardly therefrom and disposed in the plane of said filter medium receiving channel, an elongate filter medium retainer member sheathed by the tube of permeable filter medium disposed within said dirty air plenum chamber, said filter medium sheathed retainer member having one terminal end portion thereof compressively disposed within said filter medium receiving channel in said mounting member and suspended therefrom by latching engagement of the hook-like terminal end portions of said latching members with said retainer member and a dependent end disposed remote therefrom, and means closing the dependent end of said filter medium sheathed retainer member to limit the flow of the carrier gas from within said dirty air plenum inwardly through said filter medium and thence upwardly through said conduit portion of said mounting member into said clean air plenum chamber.

2. A filter bag assembly as set forth in claim 1 wherein said means for closing the dependent end of said filter medium sheathed retainer member is formed of relatively rigid elastically deformable material and comprises a gas impervious base plate a first sleeve member longitudinally extending upwardly therefrom a second sleeve member longitudinally extending upwardly from said base plate and disposed in concentrically spaced surrounding relation with said first sleeve member and defining a longitudinally disposed filter medium receiving channel therebetween having the dependent end of said filter medium sheathed retainer member compressively disposed therewithin and a plurality of displaceable latching members extending from the end of said first sleeve member having hook-like terminal end portions extending outwardly therefrom and disposed in the plane of the filter medium receiving channel in latching engagement with said retainer member to retain said dependent end of said filter medium sheathed retainer member disposed within said filter medium receiving channel.

3. A filter bag assembly as set forth in claim 1 wherein said conduit portion of said mounting member is venturi shaped.

4. A filter bag assembly as set forth in claim 1 wherein said unitary mounting member is molded of resinous material.

5. A filter bag assembly as set forth in claim 1 wherein said displaceable means is a snap ring member to facilitate a pressure induced passage thereof through the receiving aperture in the tube sheet.

6. A filter bag assembly as set forth in claim 1 wherein said retainer member is molded from resinuous material.

7. An improved filter bag assembly for dust collectors wherein particulate matter is separated from a carrier gas stream by selective passage of the carrier gas through an elongate tube of permeable filter medium terminally mounted in fluid communication with a receiving aperture in a gas impervious tube sheet separating the clean air and dirty air plenum chambers of said dust collector, said assembly comprising a unitary mounting member of relatively rigid elastically deformable material adapted to be disposed within the receiving aperture in said gas impervious tube sheet and selectively shaped to define a conduit portion for passage of the carrier gas therethrough and into said clean air plenum chamber, a tube sheet engaging portion disposed at one end of said conduit portion, and a dependent skirt portion for supportively engaging the terminal end of the tube of filter medium suspended therefrom extending downwardly from the tube sheet engaging portion and disposed in spaced surrounding relation with said conduit portion within said dirty air plenum chamber, said tube sheet engaging portion including a first outwardly extending peripheral flange member disposed transverse to the longitudinal axis of said conduit portion and sized to overlie the marginal defining edge of said receiving aperture in said tube sheet, and a second outwardly extending flange member disposed in adjacent spaced relation with said first flange member and defining a transversely disposed perimetric annular tube sheet receiving channel therebetween sized to closely accommodate the marginal defining edge of said receiving aperture in said tube sheet, said dependent skirt portion including,
- a first longitudinally extending dependent sleeve member,
- a second longitudinally extending dependent sleeve member disposed in concentrically spaced surrounding relation with said first sleeve member and defining a longitudinally disposed filter medium receiving channel therebetween, and
- a plurality of displaceable latching members dependent from said first sleeve member and having hook-like terminal end portions extending outwardly therefrom and disposed in the plane of said filter medium receiving channel, an elongate filter medium retainer member sheathed by the tube of permeable filter medium disposed within said dirty air plenum chamber, said filter medium sheathed retainer member having one terminal end portion thereof compressively disposed within said filter medium receiving channel in said mounting member and suspended therefrom by latching engagement of the hook-like terminal end portions of said latching members with said retainer member and a dependent end disposed remote therefrom, and means closing the dependent end of said filter medium sheathed retainer member to limit the flow of the carrier gas from within said dirty air plenum inwardly through said filter medium and thence upwardly through said conduit portion of said mounting member into said clean air plenum chamber.

8. A filter bag assembly as set forth in claim 7 wherein said means for closing the dependent end of said filter medium sheathed retainer member is formed of relatively rigid elastically deformable material and comprises
- a gas impervious base plate
- a first sleeve member longitudinally extending upwardly therefrom
- a second sleeve member longitudinally extending upwardly from said base plate and disposed in concentrically spaced surrounding relation with said first sleeve member and defining a longitudinally disposed filter medium receiving channel therebetween having the dependent end of said filter medium sheathed retainer member compressively disposed there within and
- a plurality of displaceable latching members extending from the end of said first sleeve member having hook-like terminal end portions extending outwardly therefrom and disposed in the plane of the filter medium receiving channel in latching engagement with said retainer member to retain said dependent end of said filter medium sheathed retainer member disposed within said filter medium receiving channel.

9. A filter bag assembly as set forth in claim 7 wherein said conduit portion of said mounting member is venturi shaped.

10. A filter bag assembly as set forth in claim 7 wherein said second flange member includes sloped upper and lower defining surfaces thereof.

11. A filter bag assembly as set forth in claim 7 wherein said retainer member is molded from resinous material.

12. In an improved filter bag assembly for dust collectors wherein particulate matter is separated from a carrier gas stream by selective passage of the carrier gas through an elongate tube of permeable filter medium terminally mounted in fluid communication with a receiving aperture in a gas impervious tube sheet separating the clean air and dirty air plenum chambers of said dust collector, the improvement comprising a unitary mounting member of relatively rigid elastically deformable material adapted to be disposed within the receiving aperture in said gas impervious tube sheet for releasably mounting said tube of filter medium on said tube sheet selectively shaped to define

- a conduit portion for passage of the carrier gas therethrough and into said clean air plenum chamber,
- a tube sheet engaging portion disposed at one end of said conduit portion, and
- a dependent skirt portion for supportively engaging the terminal end of the tube of filter medium suspended therefrom extending downwardly from the tube sheet engaging portion and disposed in spaced surrounding relation with said conduit portion within said dirty air plenum chamber, said tube sheet engaging portion including
- an outwardly extending peripheral flange member disposed transverse to the longitudinal axis of said conduit portion and sized to overlie the marginal defining edge of said receiving aperture in said tube sheet, and
- displaceable means disposed in adjacent spaced relation with said flange member and defining a transversely disposed perimetric annular tube sheet receiving channel therebetween sized to closely accommodate the marginal defining edge of said receiving aperture in said tube sheet, said dependent skirt portion including,
- a first longitudinally extending dependent sleeve member,
- a second longitudinally extending dependent sleeve member disposed in concentrically spaced surrounding relation with said first sleeve member and defining a longitudinally disposed filter medium receiving channel therebetween, and
- a plurality of displaceable latching members dependent from said first sleeve member and having hook-like terminal end portions extending outwardly therefrom and disposed in the plane of said filter medium receiving channel, supportively engageable with an elongate filter medium retainer grid sheathed by the tube of permeable filter medium adapted to be disposed within said dirty air plenum chamber to effect separation of said particulate matter and to permit a flow of the carrier gas within said tube of filter medium into said clean air plenum chamber through said conduit portion of said mounting member.

13. A mounting member as set forth in claim 12 wherein said conduit portion thereof is venturi shaped.

14. A mounting member as set forth in claim 12 wherein said displaceable means comprises a second outwardly entending flange member having a bevelled under surface to facilitate a pressure induced passage thereof through the receiving aperture in the tube sheet.

15. In an improved filter bag assembly for dust collectors wherein particulate matter is separated from a carrier gas stream by selective passage of the carrier gas through an elongate tube of permeable filter medium terminally mounted in a receiving aperture in a gas impervious tube sheet separating the clean air and dirty air plenum chambers of said dust collector, the improvement comprising a closure assembly for the dependent end of an elongate retainer member sheathed by the filter medium formed of relatively rigid elastically deformable material and comprising a gas impervious base plate a first sleeve member longitudinally extending upwardly therefrom a second sleeve member longitudinally extending upwardly from said base plate and disposed in concentrically spaced surrounding relation with said first sleeve member and defining a longitudinally disposed filter medium receiving channel therebetween sized to compressively receive the dependent end of the filter medium sheathed retainer member and a plurality of displaceable latching members extending from the end of said first sleeve member having hook-like terminal end portions extending outwardly therefrom and disposed in the plane of the filter medium receiving channel in latching engagement with said retainer member to retain said dependent end of said filter medium sheathed retainer member disposed within said filter medium receiving channel.

* * * * *